United States Patent Office 2,898,224
Patented Aug. 4, 1959

2,898,224

ADHESIVE COMPOSITION

Keith E. Polmanteer, Midland, Mich., assignor to Dow Corning Corporation, Midland, Mich., a corporation of Michigan No Drawing. Application January 31, 1955
Serial No. 485,309

3 Claims. (Cl. 106—287)

This application relates to the adhesion of silicone rubber to glass.

It has been disclosed in U.S. Patent 2,643,964 that silicone rubber can be adhered to glass by using ethylsilicate. The steps employed are: application of the silicate to the glass surface followed by hydrolysis of the silicate and application to the treated surface of an uncured silicone rubber and thereafter vulcanizing the rubber to obtain adhesion. Whereas this method appears suitable for such a process it is not applicable for adhering previously vulcanized silicone rubber to a glass surface. There are many operations in which it is highly desirable to adhere vulcanized silicone rubber to glass since this simplifies fabrication problems in the making of laminates, for example, such as those found in safety glass.

It is the primary object of this invention to provide an adhesive composition suitable for adhering vulcanized silicone rubber to glass. Another object is to provide a simplified method for adhering silicone rubber to glass. Other objects and advantages will be apparent from the following description.

This invention relates to an adhesive composition composed essentially of ethylpolysilicate and from .1 to 5% by weight based on the weight of the silicate of an aliphatic carboxylic acid salt of an alkyl tin compound.

The ethylpolysilicate employed herein is a benzene soluble polymeric material in which some of the silicon atoms are linked through oxygen atoms and the remaining valences of the silicon atoms are satisfied by alkoxy groups or hydroxyl groups. This material is commercially available.

The tin catalysts which are employed in the composition of this invention are of the formula $R_nSn(OOCR')_{4-n}$ in which R and R' are any aliphatic hydrocarbon radicals and $n$ has a value from 1 to 3 inclusive. Specific examples of tin catalysts which are operative herein are dibutyl-tin-diacetate, ethyl-tin-tri-2-ethylhexoate, triethyl-tin-acetate, dibutyl-tin-di-2-ethylhexoate, dipropyl-tin-dinaphthenates, dioctyl-tin-distearate and cyclohexyl-tin-tri-2-ethylhexoate.

The composition of this invention can be used to adhere any silicone rubber to glass. Thus the siloxane in the silicone rubber may be substituted with any monovalent hydrocarbon radical such as alkyl radicals such as ethyl, methyl, propyl and octadecyl; cycloaliphatic radicals such as cyclohexyl and cyclohexenyl; alkenyl radicals such as vinyl, allyl and hexenyl; aryl hydrocarbon radicals such as phenyl, tolyl and xenyl; alkaryl hydrocarbon radicals such as benzyl and halogenated hydrocarbon radicals such as chlorophenyl, bromoxenyl, trifluorovinyl, $\alpha,\alpha,\alpha$-trifluorotolyl, and tetrafluoroethyl.

The rubber may contain any of the well-known fillers such as metal oxides such as titania, zinc oxide, lead oxide, ferric oxide; silica fillers such as diatomaceous earth, crushed quartz, fume silicas, silica aerogels, organic fillers such as cork, wood flour and organic fabrics and siliceous fillers such as clay, glass and asbestos.

Furthermore, the rubber may have been vulcanized by any of the known silicone rubber vulcanization catalysts such as organic peroxides such as benzoyl peroxide, t-butyl-perbenzoate or chlorobenzoyl peroxides; sulfur or sulfur plus sulfur accelerators and alkyl silicates.

In the use of the adhesives of this invention the glass surface is preferably cleaned of any foreign material such as dirt and grease. The glass is then coated with the adhesive composition and the vulcanized silicone rubber may be immediately applied and the assembly is heated under pressure of preferably less than 250 p.s.i. for a time sufficient to insure good bonding. In general, subjecting the assembly to temperatures of from 200–400° F. and pressures up to 250 lbs. for from 10–25 minutes is sufficient to give excellent bonding. Preferably the pressures should be 200 lbs. p.s.i. or less since this greatly reduces the danger of breaking the glass.

The adhesive of this invention gives the strongest bond between vulcanized silicone rubber and glass of any adhesive previously known. Furthermore, this adhesive bond is developed at sufficiently low pressure and temperature that it is practical for use in the adhering of silicone rubber to plate glass and to other useful forms of glass.

The following examples are illustrative only and should not be construed as limiting the invention which is properly delineated in the appended claims.

Example 1

This example shows the superiority of the composition of this invention over those previously known in the art.

(A) In this run the adhesive employed was composed of 100 parts by weight of ethylpolysilicate, boiling above 250° C. at atmospheric pressure and .3 parts by weight ferric chloride. This mixture was applied in a thin film to a cleaned glass plate and a sheet of silicone rubber was then applied thereto. The assembly was heated in a press for 10 minutes at 125° C. under a pressure of 50 p.s.i. The assembly was then removed from the press and the adhesive strength of the bond between the silicone rubber and glass in this example and the following examples was determined as follows:

A 1″ wide strip of the silicone rubber was pulled from the glass surface and the maximum pull in pounds per inch encountered during the removal was recorded. These were: immediately after cure .8 lb. per inch and after 5 days of aging at room temperature 3.2 lbs. per inch.

(B) In this run the adhesive employed was 100 parts by weight of ethylpolysilicate boiling above 250° C. at atmospheric pressure and .3 part by weight $SnCl_4$. This adhesive was applied to a clean glass plate in a thin film and a sheet of silicone rubber of the type employed in (A) was applied to the adhesive and the assembly was heated in a press 30 minutes at 150° C. under pressure of 250 p.s.i.. The assembly was then removed from the press and cooled and the adhesive strength was found to be immediately after curing 1.9 lbs. per inch and after 5 days of aging 8.8 lbs. per inch.

(C) 100 parts by weight of ethylpolysilicate boiling above 250° C. at atmospheric pressure were mixed with .3 part by weight dibutyl-tin-di-2-ethylhexoate and the mixture applied in a thin film to a clean glass plate. A sheet of silicone rubber of the type employed in A and B was applied to the adhesive and the assembly was heated for 30 minutes at 150° C. under a pressure of 250 p.s.i. The assembly was removed from the press and cooled and the adhesive strength immediately after curing was 19.2 p.s.i.

Example 2

The adhesive employed in this example had a composition of 100 parts by weight of ethylpolysilicate boiling above 250° C. at atmospheric pressure and 1 part by weight dibutyl-tin-di-2-ethylhexoate. The silicone rubber employed was composed of 100 parts by weight of a copolymer of 92.5 mol percent dimethylsiloxane and 7.5 mol percent phenylmethylsiloxane, 30 parts by weight silica, 3 parts by weight ethylpolysilicate and .5 part by weight dibutyl-tin-2-ethylhexoate. This rubber had been vulcanized by the polysilicate-tin catalyst combination at room temperature.

The adhesive was applied to a clean piece of plate glass and a sheet of the silicone rubber applied thereto and the assembly heated at a temperature of 300° C. at a pressure of 230 p.s.i. for 10 minutes. The adhesion between the silicone rubber and the glass was so great that the rubber broke before the adhesive bond parted.

The above experiment was repeated except that the assembly was laminated at 200 p.s.i. In this case the bond strength between the rubber and the glass was 21 pounds per inch.

*Example 3*

Excellent adhesion is obtained when a benzoyl-peroxide vulcanized silicone rubber having the composition 100 parts by weight of a copolymer of 75 mol percent dimethylsiloxane and 25 mol percent

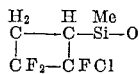

and 30 parts by weight of a fume silica is employed in the method of Example 2.

*Example 4*

Excellent adhesion is obtained when a silicone rubber having the composition 100 parts by weight of a copolymer of 95 mol percent dimethylsiloxane and 5 mol percent methylvinylsiloxane and 30 parts by weight of a silica aerogel which rubber was vulcanized by heating with 2 parts by weight sulfur, 2 parts by weight selenium diethyldithiocarbamate and 1 part by weight mercaptobenzothiazol is employed in the method of Example 2.

*Example 5*

Good adhesion is obtained when 1 part by weight of each of the following catalysts is employed in the method of Example 2.

Dibutyl-tin-diacetate,
Diethyl-tin-dinaphthenate,
Butyl-tin-tri-2-ethylhexoate and
Tributyl-tin-acetate.

That which is claimed is:

1. An adhesive composition consisting essentially of ethylpolysilicate and from .1 to 5% by weight based on the weight of the silicate of a compound of the formula $R_nSn(OOCR')_{4-n}$ in which R and R' are aliphatic hydrocarbon radicals and $n$ has a value from 1 to 3 inclusive.

2. An adhesive composition consisting essentially of ethylpolysilicate and from .1 to 5% by weight based on the weight of the silicate of dibutyl-tin-di-2-ethylhexoate.

3. An adhesive composition consisting essentially of ethylpolysilicate and from .1 to 5% by weight based on the weight of the silicate of butyl-tin-tri-2-ethylhexoate.

References Cited in the file of this patent
UNITED STATES PATENTS

| | | |
|---|---|---|
| 2,395,880 | Kirk | Mar. 5, 1946 |
| 2,504,388 | Braley | Apr. 18, 1950 |
| 2,560,034 | Eberly | July 10, 1951 |
| 2,610,169 | Hyde et al. | Sept. 9, 1952 |
| 2,727,875 | Mack | Dec. 20, 1955 |